May 24, 1949.　　　V. E. GLEASMAN　　　2,471,031
HYDRAULIC TRANSMISSION

Filed Sept. 19, 1944　　　　　　　　　　　　4 Sheets-Sheet 1

Inventor
VERNON E. GLEASMAN

May 24, 1949.　　　V. E. GLEASMAN　　　2,471,031
HYDRAULIC TRANSMISSION
Filed Sept. 19, 1944　　　　　　　　　　　　4 Sheets-Sheet 2
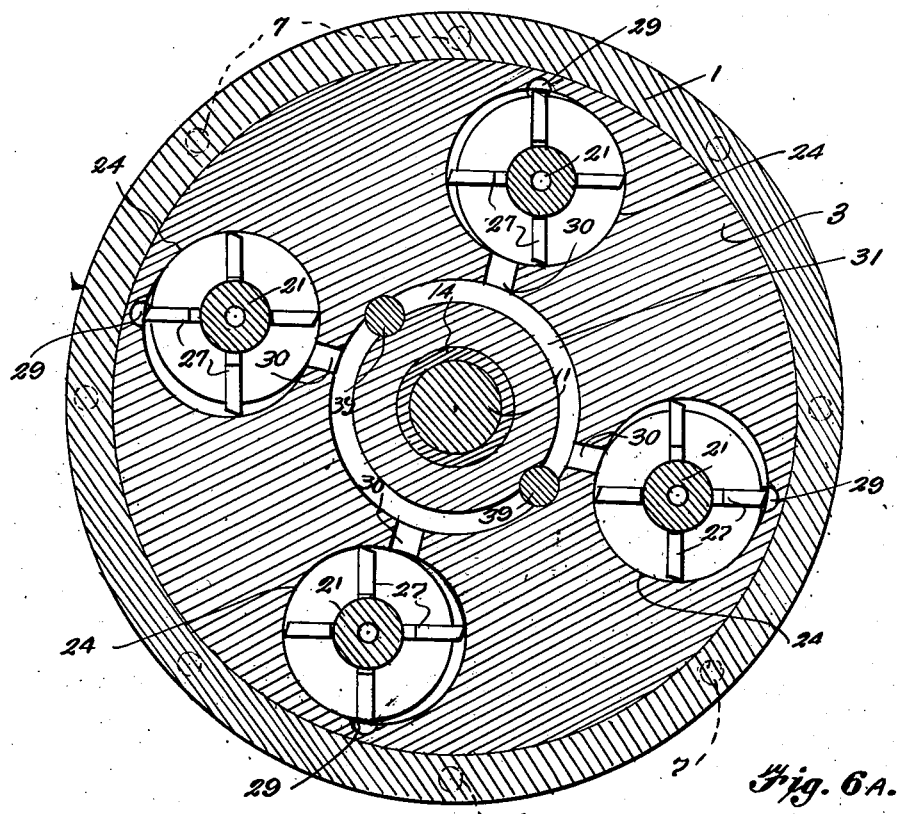
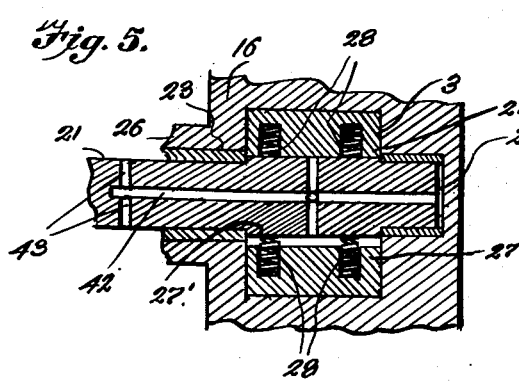
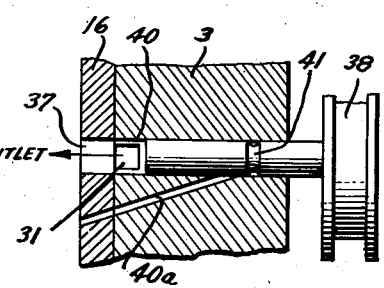
Inventor
VERNON E. GLEASMAN May 24, 1949.   V. E. GLEASMAN   2,471,031
HYDRAULIC TRANSMISSION Filed Sept. 19, 1944   4 Sheets-Sheet 3

Inventor
VERNON E. GLEASMAN
By
Attorney

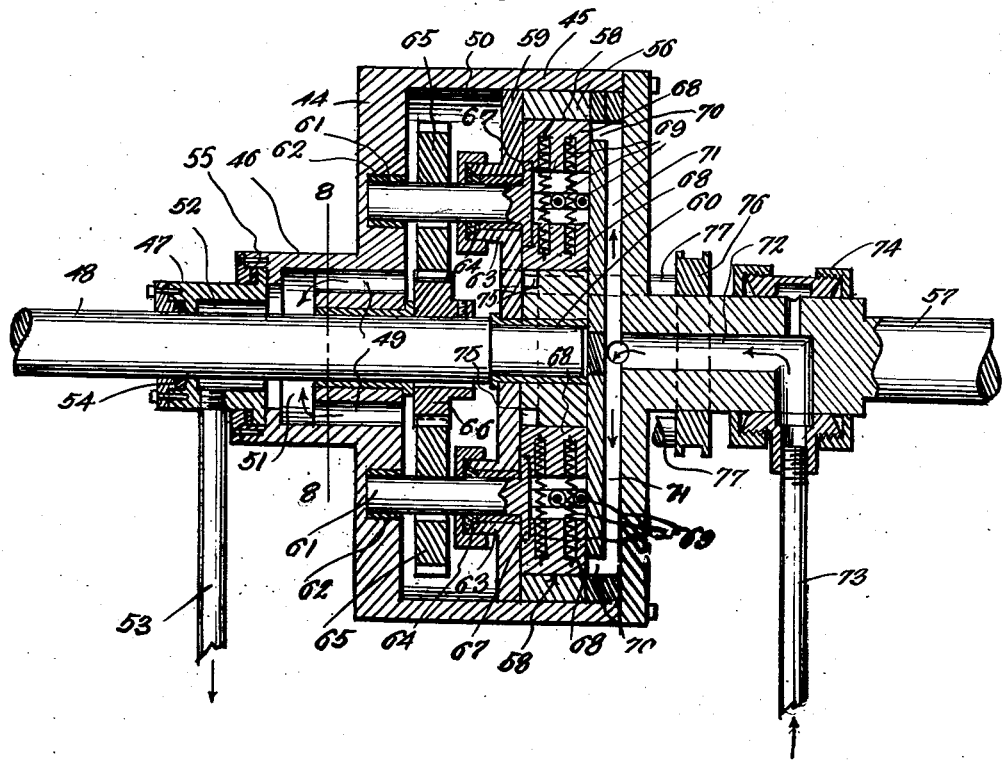
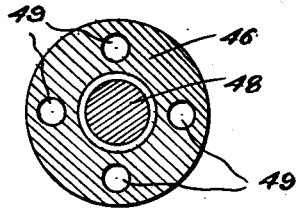
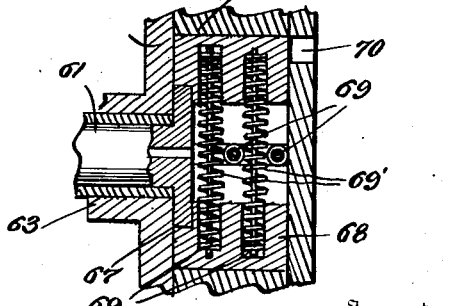
VERNON E. GLEASMAN

Patented May 24, 1949

2,471,031

UNITED STATES PATENT OFFICE 2,471,031

HYDRAULIC TRANSMISSION

Vernon E. Gleasman, Elmira, N. Y.

Application September 19, 1944, Serial No. 554,821

17 Claims. (Cl. 74—774)

1

This invention relates to a hydraulic transmission and has as an object to provide a transmission having an improved arrangement of rotary pumps mounted in a housing or casing carried by a drive shaft and having geared connection with a driven shaft, the gears of the pumps and the driven shaft being located within the casing and so arranged that the pump gears may turn the driven shaft at the same speed as the driving shaft, or turn about the gear of the driven shaft to cause rotation of the driven shaft at a reduced speed.

Another object is to so form the pumps that as they rotate, oil or an equivalent liquid will be circulated through the casing, the freedom of circulation controlling ratio of rotation between gears of the pumps and the gear of the driven shaft with which they mesh and consequently the speed ratio between the drive shaft and the driven shaft.

Another object is to provide an improved valve having a collar slidable along the drive shaft and carrying valve plungers passing through openings in the transmission casing and movable into and out of position to fully or partially cut off flow of liquid through outlets of the pump chambers.

Another object of the invention is to so form the valve and liquid outlets of the pump chambers that one plunger may control flow of liquid from a plurality of pump chambers.

Another object of the invention is to so arrange fluid passages of the transmission casing that during rotation of the drive shaft and the casing, centrifugal force created by such rotation will tend to move liquid toward the periphery of the casing and thus cause liquid to very readily enter inlets of the pump chambers.

Another object of the invention is to provide a transmission of such construction that speed of rotation imparted to the driven shaft may be progressively increased or decreased very gradually.

In the accompanying drawings:

Fig. 2 is a transverse sectional view on the line 2—2 of Fig. 1.

Fig. 5 is a sectional view on the line 5—5 of Fig. 4.

2

Figure 6:
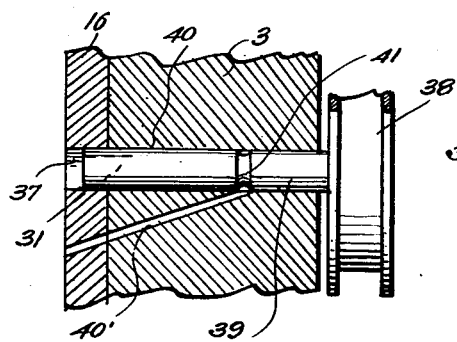

Fig. 6 is a fragmentary sectional view showing the construction of the valve for controlling speed at which the driven shaft rotates.

Fig. 6A is a view similar to Fig. 6 showing the valve opened.

Fig. 7 is a sectional view taken longitudinally through a transmission of modified construction.

Fig. 8 is a sectional view taken on the line 8—8 of Fig. 7.

Fig. 9 is a fragmentary sectional view taken through one of the pumps longitudinally thereof.

This improved hydraulic transmission has a casing 1 formed of strong metal and circular in cross section, as shown in Fig. 2. The end wall 2 of the casing or housing 1 is formed integral therewith but the other end of the casing is formed open to receive a block 3 which fits snugly within the casing and about its periphery is formed with a flange 4 having openings 5 therein. These openings register with threaded sockets 6 so that screws 7 may be passed through openings 5 and screwed tightly into the sockets 6 to firmly but removably hold the block 3 in place.

Figure 3:
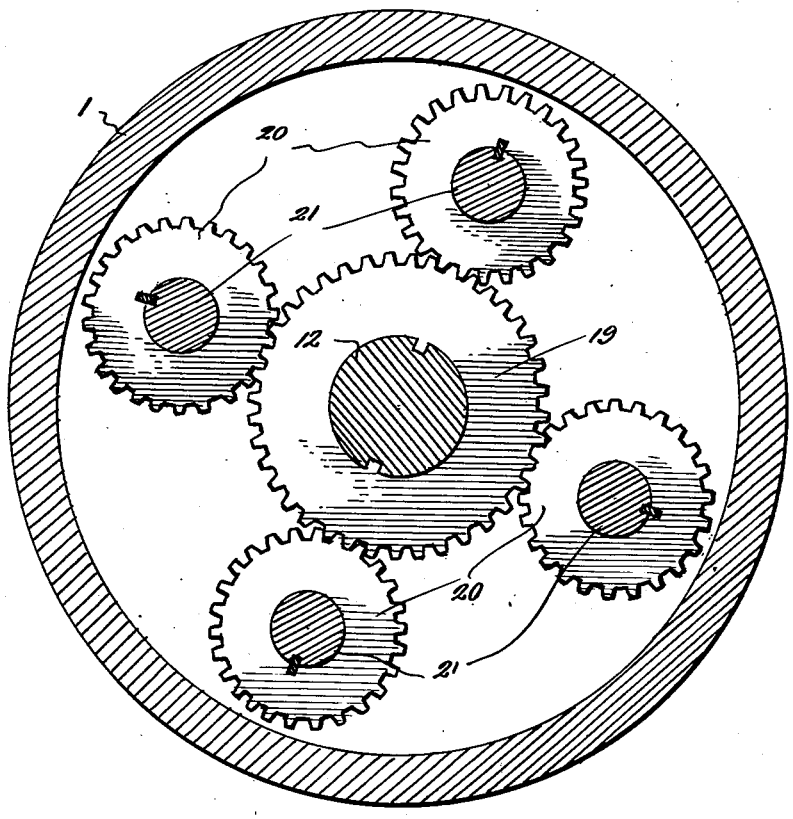
Fig. 3 is a sectional view on the line 3—3 of Fig. 1.

The block 3 carries a drive shaft 8 which is shown integral with the block but may be suitably fixed at the center of the outer side face thereof, and the inner side face of the block is spaced from the wall 2 in order to provide a chamber 9 within the casing. At its inner side the block 3 is formed with a centrally located socket 10 to rotatably receive the reduced inner end portion 11 of a driven shaft 12. A thrust bearing 13 is mounted at the center of the socket and the inner end of the driven shaft and there has also been provided a bushing 14 which fits snugly within the socket and also passes through an opening 15 formed centrally of the face plate 16 of the block and registering with the socket 10. The chamber 2 is filled with oil, or other suitable liquid, through an opening 17 which is then closed by a threaded plug screwed into the filling opening and, in order to prevent leakage of oil out of the chamber about the driven shaft, there has been provided a packing box 18 of conventional formation. A gear 19 (Fig. 3) is keyed to the driven shaft 12 within the chamber 9 and meshes with gears 20 keyed to shafts 21 which have their outer ends rotatably mounted in sockets 22 formed in the inner surface of the wall 2 and evenly spaced from each other circumferentially thereof. The shafts 21 constitute pump shafts and pass through openings 23 formed in the face plate 16 and through pump chambers 24, with their inner ends rotatably mounted in sockets 25 formed centrally of inner ends of the pump chambers. Necks 26 project forwardly from the face plate 16 about the openings 23 and carry packing glands or nuts 26' to prevent escape of oil from the pump chambers 24 about the pump shafts 21.

Figure 1:
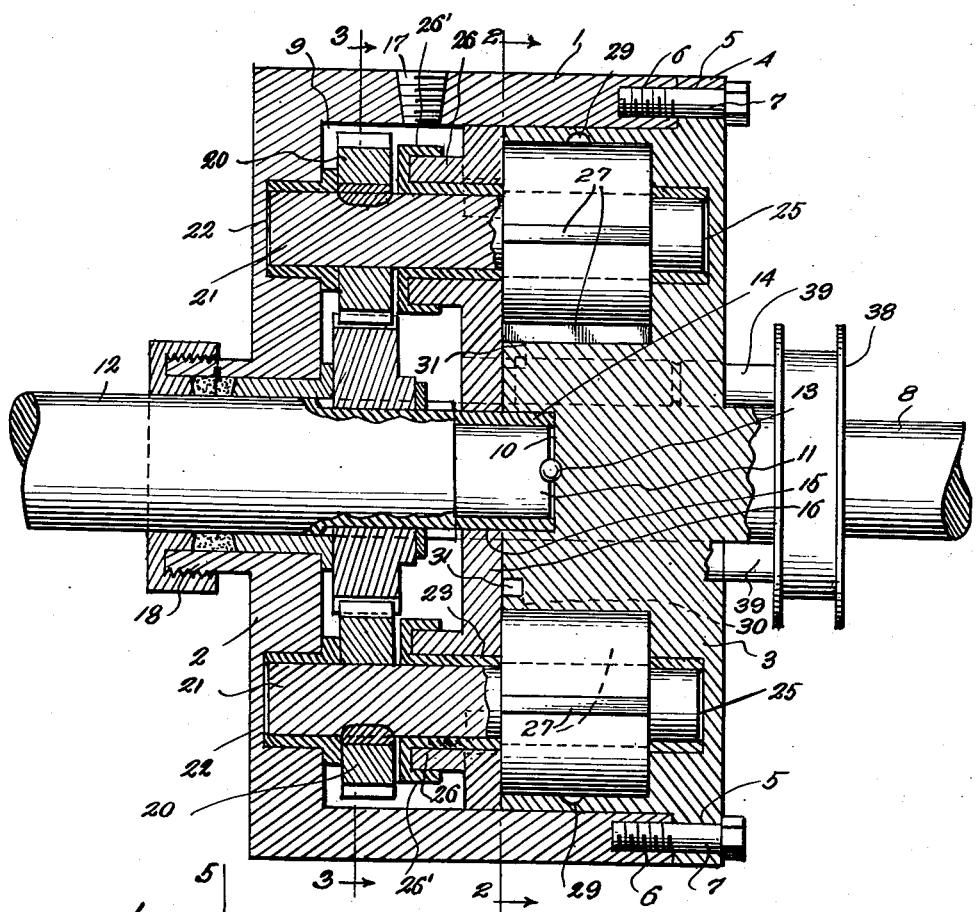
Fig. 1 is a vertical sectional view taken through the transmission longitudinally thereof.
Figure 4:
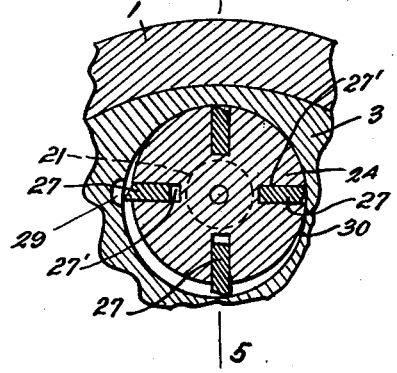
Fig. 4 is a fragmentary sectional view taken through one of the pump chambers transversely thereof.

The pump chambers 24 are of duplicate formation and each has its side wall concentric to the shaft 21 for a portion of its circumference and for the remainder of its circumference, eccentric to the shaft, as shown in Figs. 2 and 4, so that, as the shaft rotates, blades 27 carried by the shaft and extending radially thereof, may have compressing action upon oil in the offset portion of the chamber. The blades are slidably mounted on grooves or seats 27' formed in the shaft and are urged outwardly by springs 28 which keep the outer ends of the blades pressed firmly against the side wall of the pump chambers 24. The oil enters the pump chambers through inlets 29 near the periphery of the block 3 and, as the blades move through the offset portions of the chambers, the oil is forced under pressure through outlets 30 and into a circular channel 31 from which it flows through passages 37 in wall 16 back into the chamber 9. When the oil is allowed to flow freely through the groove 31 and the passages 37, the pump shafts and their blades may move freely in the pump chambers and the gears 20 will travel about the gear 19 without turning the gear 19 and the driven shaft. When flow of oil through groove 31 and passages 37 is cut off, the pressure created by action of the pump blades will prevent turning of the pump shafts and, since the gears 20 will then be prevented from traveling about the gear 19, the driven shaft 12 will turn at the same speed as the drive shaft 8. By partially cutting off flow of oil from the pump chambers, rotation of the pump shafts may be reduced and, as the pump shafts turn, the gear 19 will be turned with them at a slower rate of speed than the speed at which the drive shaft turns. Therefore, by gradually cutting off flow of oil from the pump chambers, the speed at which the driven shaft rotates may be gradually reduced from full speed to a full stop.

The valve by which flow of oil from the pump chambers is controlled consists of a collar 38 which fits about the drive shaft 8 and is slidable therealong, the collar being provided with plungers 39 slidably received in openings 40 formed through the block 3 longitudinally thereof and alined with the outlets 37. The openings 40 intersect the groove 31 and when the plungers are in the position of Fig. 6, flow of oil through outlets 37 will be cut off. The plungers are formed with circumferentially extending grooves 41, and, from an inspection of Fig. 6, it will be seen that any oil attempting to flow along the plungers will upon reaching groove 41, flow back through drawing openings 40A. By sliding the collar 38 along the drive shaft, the plungers will be shifted longitudinally and their inner ends moved into or out of the outlets 37 and the groove 31. When the plungers 39 are in position to extend across the groove 31 and enter the ports 37, the ports are closed and fluid under pressure that might escape along plungers 40 would be trapped and brought back to the reservoir through the passage 40A. These passages 40A are drilled at an angle so that centrifugal force will act to remove any fluid that might enter the passage.

By arranging the oil passages as shown in Fig. 2, a pair of plungers may control flow of oil from four pumps in an infinite manner between zero and 100%. This arrangement also disposes two pumps on each side of each valve plunger and maintains a hydraulic balance on the valve plungers so that they will actuate freely under pressure. The pump shafts are each formed with a longitudinally extending bore 42 which communicate with the grooves 27 and have branch ports 43 communicating with the chamber 9, so that, during operation of the transmission, air or oil may flow into and out of inner ends of the grooves 27 and thus prevent formation of fluid cushions which would interfere with proper sliding of the blades 27.

In Fig. 7, there has been shown a transmission of modified construction. In this embodiment, the front wall 44 of the casing 45 is formed at its center with an extension 46 carrying an adaptor 47 at its outer end. The driven shaft 48 is rotatably mounted through the extension 46 and the adaptor 47, and the extension is formed with circumferentially spaced oil passages 49 so that oil in the chamber 50 of the casing may flow through these passages into a chamber 51 and into the pocket 52 of the adaptor 47, from which the oil flows through a pipe 53 to an oil reservoir 53A. Packings 54 and 55 are provided at ends of the adaptor to prevent leakage and allow the casing to turn, while the adaptor 47 remains stationary.

The block 56, which fits snugly within the rear portion of the casing 45 and is secured thereto so that the casing turns with the drive shaft 57 projecting rearwardly from the casing, is formed with pump chambers 58 closed at their front ends by face plate 59. A socket 60 is formed at the center of the block 56 to rotatably receive the inner end portion of the driven shaft 48, so that the casing 45 and block 56 may turn about the driven shaft when the driven shaft is to be turned at a speed slower than the speed of the drive shaft. Pump shafts 61 extend through the chamber 50 in spaced parallel relation to the driven shaft with their front ends rotatably mounted in sockets 62 formed in the wall 44. These pump shafts 61 are rotatably mounted through bearing sleeves 63 having packings 64 at their front ends, and the shafts carry spur gears 65 which mesh with the the gear 66 carried by the driven shaft. When the pump shafts are held against rotation in the sleeves and sockets, the gears 65 may not travel about the gear 66 and the driven shaft turns at the same speed as the drive shaft. When the gears 65 are permitted to travel about the gear 66, the driven shaft 48 will be rotated at reduced speed, or it will remain stationary, according to the freedom with which the gears 65 are permitted to travel about the gear 66. The pumps 67 from which the pump shafts extend are rotatably received in the pump chambers 58 and carry blades 68 which are urged outwardly by springs 69 coiled about pins 69', so that, as the pumps rotate, the blades will be maintained in contact with the peripheral walls of the pump chambers. The pump chambers each has its peripheral wall formed with a portion eccentric to the pump operating therein and with this portion communicates an inlet port 70, the ports being extending laterally from outer ends of passages 71 formed in the block radially thereof and leading from an inlet passage 72 extending longitudinally of the drive shaft. The outer end of the inlet passage communicates with a feed pipe 73 leading from the reservoir 53A to which pipe 53 extends and a coupling 74 connects the feed pipe with the drive shaft so that the feed pipe may remain stationary while the drive shaft rotates. The blades of the pump force the oil delivered from pipe 73 through the circular groove 75 and the outlets of the block and into the chamber 50, from which the oil flows through the extension 46 and through pipe 53 back to the reservoir. When flow of oil from the pump chambers is unrestricted, the pump shafts turn freely and their gears 65 move about the gear 66 without causing rotation of the driven shaft but, by obstructing flow of oil from the pump chambers, the pressure created will retard or entirely prevent turning of the pump shafts and rotary motion will be imparted to the driven shaft. The speed at which the driven shaft rotates depends upon the extent to which movement of the gears 65 about gear 66 is retarded, and it is to be understood that this may be gradually effected until rotation of the pump shafts and their gears is entirely stopped and the driven shaft caused to turn at the same speed as the drive shaft. The valve by which flow of oil from the pump chambers is regulated has a collar 76 which is slidable along the drive shaft and plungers 77 carried by the collar and passing through openings in the block with their inner portions adapted to gradually move into or out of blocking relation to the outlets of the pump chambers, according to the direction in which the block is shifted along the drive shaft. This valve mechanism has not been illustrated in detail as it is of the same construction previously shown and described.

The fluid pumps are used to retard rotation of the shafts. Therefore, they may be termed fluid brakes. It should also be noted that these pumps are designed for minimum volume and maximum power, instead of maximum volume and minimum power, since they are to serve as brakes and not merely as pumps.

Having thus described the invention, what is claimed is:

1. In a hydraulic transmission, a casing open at one side, a block closing the open side of said casing and spaced from the opposite side thereof to provide a chamber in the casing for containing liquid, a rotary drive shaft extending outwardly from said block, a driven shaft passing through the center of the second side of the casing into said chamber and rotatably mounted in a bearing at the center of said block, said block being formed with pump chambers spaced from each other circumferentially thereof, rotary pumps operating in said pump chambers and having shafts extending into the liquid chamber in spaced parallel relation to the driven shaft, a gear carried by the driven shaft within the liquid chamber, gears carried by the pump shafts and meshing with the gear of the driven shaft, the pump chambers each having an inlet adjacent the periphery of the block and an outlet communicating with an annular channel having discharge openings leading therefrom to the liquid chamber, and a valve for controlling flow of liquid from the pump chambers into the liquid chamber consisting of a collar fitting about the drive shaft and slidable along same and plungers projecting from the collar through openings formed in the block and across the channel and the discharge openings transversely thereof to control flow of liquid through same.

2. In a hydraulic transmission, a casing having a side wall and a peripheral wall and open at its other side, a block closing the open side of said casing and spaced from said side wall to provide a liquid chamber in the casing, a drive shaft fixed to and extending outwardly from said block, a driven shaft passing through the side wall and rotatably mounted at the center of the block, said block having pump chambers therein, rotary pumps in the pump chambers having shafts extending into the liquid chamber, a gear carried by said driven shaft, gears carried by the pump shafts and meshing with the gear of the driven shaft, said pump chambers having an inlet and an outlet, the block being formed with a circular channel with which outlets of the pump chambers communicate and with discharge passages leading from the channel to the liquid chamber, the block being also formed with longitudinally extending openings aligned with the outlets of the pump chambers and with drain passages leading from the said longitudinally extending openings intermediate the length thereof, and a valve having a collar slidable along the drive shaft and plungers extending from the collar and through the longitudinally extending openings in the block, said plungers passing through the circular channel and being movable into and out of the outlets and each being formed intermediate its length with a circumferential groove moved into and out of registry with the drain passage leading from the opening in the block in which the plunger fits when the plungers are shifted longitudinally into and out of a closing position.

3. In a hydraulic transmission, a casing having a liquid chamber therein and provided with circumferentially spaced pump chambers at one side of the liquid chamber, a drive shaft fixed to said side of said casing whereby the casing turns with the drive shaft, a driven shaft rotatably mounted through the other side of the casing in alinement with the drive shaft, rotary pumps in the pump chambers having shafts extending across the liquid chamber in spaced parallel relation to the driven shaft and geared to the driven shaft, each pump chamber having an inlet toward the periphery of the casing, there being an annular outlet channel communicating with all of the pump chambers and discharge passages leading from the annular channel between certain of the pump chambers to the liquid chamber, a valve having a collar slidable along the drive shaft and plungers extending from the collar and slidably engaged in openings intersecting the annular channel at the discharge passages, and means for shifting said collar along the drive shaft and gradually moving the plungers into and out of closing relation to the discharge openings.

4. In a hydraulic transmission, a casing having a liquid chamber therein and provided with circumferentially spaced pump chambers at one side of the liquid chamber, a drive shaft fixed to the said side of said casing whereby the casing turns with the drive shaft, a driven shaft rotatably mounted through the other side of the casing in alinement with the drive shaft, rotary pumps in the pump chambers having shafts extending into the liquid chamber and provided with gears meshing with a gear carried by the driven shaft, each pump chamber having an inlet communicating with the liquid chamber and an outlet, there being a channel communicating with all of the outlets and discharge openings leading from the channel to the liquid chamber, and a valve having a collar shiftable longitudinally of the drive shaft and having plungers passing through the channel transversely thereof at the discharge openings and movable with the collar into and out of position to block the discharge passages.

5. A hydraulic transmission including a rotatable casing having a shaft rigid with one side and a second shaft rotatably engaged with its other side, said casing having a liquid chamber therein and pump chambers extending transversely of the liquid chambers and disposed about the shafts, rotary pumps in said pump chambers and having shafts extending into the liquid chamber, means for transmitting rotary motion from the second shaft to the pump shafts, said casing being formed with an annular channel concentric with the shafts and surrounded by the pump chambers, the pump chambers having inlets and outlets spaced from the inlets and communicating with said channel, there being discharge openings leading from said channel, and a valve having plungers slidable through the channel transversely thereof and formed with grooves moving into and out of registry with the discharge openings as the plungers are moved.

6. In a hydraulic transmission, a casing having a liquid chamber therein and provided with circumferentially spaced pump chambers at one side of the liquid chamber, a drive shaft fixed to said side of said casing whereby the casing turns with the drive shaft, a driven shaft rotatably mounted through the other side of the casing in alignment with the drive shaft, rotary pumps in the pump chambers having shafts extending into the liquid chamber and provided with gears meshing with a gear carried by the driven shaft, each pump chamber having an inlet communicating with the liquid chamber and an outlet, a channel communicating with all of the outlets and also communicating with the liquid chamber, and a valve movable into and out of position for gradually cutting off flow of liquid from said channel and thereby stopping rotation of the pump shafts to cause turning of the driven shaft with the casing and the drive shaft.

7. In a hydraulic transmission, a casing having a liquid chamber therein and provided with circumferentially spaced pump chambers at one side of the liquid chamber, a drive shaft fixed to said side of said casing whereby the casing turns with the drive shaft, a driven shaft rotatably mounted through the other side of the casing in alignment with the drive shaft, rotary pumps in the pump chambers having shafts extending into the liquid chamber and provided with gear meshing with a gear carried by the driven shaft, each pump chamber having an inlet and an outlet spaced from the inlet circumferentially of the pump chamber, the portion of the peripheral wall of each pump chamber between its inlet and its outlet being eccentric to the chamber and the rotary pump therein, said pumps having blades slidable radially thereof and urged outwardly for contact with the peripheral walls of the pump chambers and applying pressure to liquid as they move toward the outlets of the pump chambers, an annular channel communicating with the outlets of all the pump chambers and having discharge openings leading therefrom between certain of the outlets to the liquid chamber, a collar slidable along the drive shaft, and plungers extending from the collar and through the channel at the discharge openings and constituting valve members for gradually shutting off flow of liquid from the channel and the pump chambers as the collar is shifted along the drive shaft in one direction.

8. In a hydraulic transmission, a casing having a liquid chamber therein and provided with circumferentially spaced chambers at one side of the liquid chamber, a drive shaft fixed to said side of said casing whereby the casing turns with the drive shaft, a driven shaft rotatably mounted through the other side of the casing in alignment with the drive shaft, rotary fluid brakes in the spaced chambers having shafts extending into the liquid chamber and provided with gears meshing with a gear carried by the driven shaft, each spaced chamber having an inlet and an outlet spaced from the inlet circumferentially of said chamber and communicating with the liquid chamber, the side wall of the casing having an extension about the driven shaft and an adaptor about the driven shaft rotatably engaged by the outer end of said extension, a portion of the said side wall of the casing forming a side wall of the extension and being formed with openings leading from the liquid chamber, a pipe for connecting said adaptor with a reservoir, the drive shaft being formed with a liquid passage having radiating branches leading to inlets of the pump chambers, a coupling surrounding the drive shaft at the inlet of its liquid passage, and a pipe extending from the coupling for connection with the reservoir.

9. In a hydraulic transmission, a casing having a liquid chamber therein and provided with circumferentially spaced chambers at one side of the liquid chamber, a driven shaft fixed to said side of said casing whereby the casing turns with the driven shaft, a drive shaft rotatably mounted through the other side of the casing in alignment with the driven shaft, rotary fluid brakes in the spaced chambers having shafts extending into the liquid chamber and provided with gears meshing with a gear carried by the drive shaft, each spaced chamber having an inlet and an outlet spaced from the inlet circumferentially of said chamber and communicating with the liquid chamber, the side wall of the casing having an extension about the drive shaft and an adaptor about the drive shaft rotatably engaged by the outer end of said extension, the side wall of its extension being formed with openings leading from the liquid chamber, a pipe for connecting said adaptor with a reservoir, the driven shaft being formed with a liquid passage having radiating branches leading to inlets of the pump chambers, a coupling surrounding the driven shaft at the inlet of its liquid passage, and pipe extending from the coupling for connection with the reservoir.

10. In a hydraulic transmission, a casing having a liquid chamber therein and circumferentially spaced pump chambers at one side of the liquid chamber, a drive shaft fixed to said casing at a side thereof, a driven shaft rotatably mounted through the other side of the casing, bearings about said shafts rotatably mounting the shafts and permitting rotation of the casing relative to the driven shaft, the drive shaft being formed with an inlet passage communicating with the pump chambers and the fluid chamber having an outlet extending through the bearing about the driven shaft, rotary pumps in the pump chambers having shafts extending into the liquid chamber, intermeshing gears carried by the pump shafts and the driven shafts, means for controlling flow of liquid through the pump chambers and thereby regulating rotation of the pumps and the speed at which the driven shaft is rotated and pipes for connecting the inlet and the outlet with opposite ends of a reservoir through which liquid is circulated during operation of the transmission.

11. In a hydraulic transmission, a casing having a liquid chamber therein and circumferentially spaced pump chambers at a side of the liquid chamber, a drive shaft extending from the said side of the casing and formed with an inlet communicating with the pump chambers, a neck extending from the opposite side of the casing, a driven shaft passing through said neck into the liquid chamber, rotary pumps in the pump chamber having shafts extending into the liquid chamber and geared to the driven shaft, stationary adaptors about the drive shaft and the driven shaft, the adaptors about the driven shaft rotatably engaging the neck and cooperating therewith to provide an outlet for the liquid chamber, pipes for connecting the adaptors with an outside liquid reservoir and establishing a circulation of liquid through the casing and its chamber during operation of the transmission, and valve means for controlling flow of liquid and thereby regulating the speed at which the driven shaft is rotated by action of the pumps.

12. In a hydraulic transmission, a casing, a drive shaft extending from a side of the casing, a drive shaft entering the casing through the other side thereof, stationary adaptors rotatably supporting the shafts and the casing, rotary pumps in the casing connected with the driven shaft by gearing for rotating the driven shaft during rotation of the casing, and the drive shaft, one adaptor having an inlet communicating with the rotary pumps and the other adaptor having an outlet for escape of liquid from the casing, pipes for connecting the inlet and the outlet with an outside reservoir whereby a circulation of liquid may be established through the pumps and the casing, and valve means for controlling flow of liquid through the pumps and thereby regulating rotation of the pumps and the speed at which the driven shaft rotates.

13. In a hydraulic transmission, a casing, a drive shaft extending from a side of the casing, a driven shaft entering the casing through the other side thereof, said casing having a liquid chamber therein and circumferentially spaced pump chambers at a side of the chamber, rotary pumps in the pump chambers having shafts extending into the liquid chambers and carrying gears meshing with a gear upon the driven shaft, a stationary adaptor for the drive shaft having a liquid inlet communicating with a passage leading to the pump chambers, a stationary adaptor for the driven shaft and the casing having an outlet communicating with the liquid chamber, pipes for connecting the inlet and the outlet with a liquid reservoir, and valve means for controlling flow of liquid through the pump chambers.

14. In a hydraulic transmission, a casing, a drive shaft extending from a side of the casing, a driven shaft entering the casing through the other side thereof, said casing having a liquid chamber therein and circumferentially spaced pump chambers at a side thereof, rotary pumps in the pump chambers having shafts extending into the liquid chamber and carrying gears meshing with a gear upon the driven shaft, the pump chambers each having an inlet and an outlet spaced from the inlet circumferentially of the pump chamber and communicating with a circular passage within the casing and communicating with discharge passages formed in the casing parallel with the shafts and communicating with the liquid chambers, the said discharge passages each having communication with the circular passage at a point between two of said outlets for, and valve means for controlling flow of liquid from the pump chambers having plungers slidable in the discharge passage to adjusted positions.

15. In a hydraulic transmission, a casing, a drive shaft extending from a side of the casing, a driven shaft entering the casing through the other side thereof, said casing having a liquid chamber therein and circumferentially spaced pump chambers at a side thereof, rotary pumps in the pump chambers and carrying gears meshing with a gear upon the driven shaft, the pump chambers each having an inlet and an outlet spaced from the inlet circumferentially of the pump chamber and communicating with a circular passage concentric with the casing and the shafts and communicating with discharge passages, the rotary pumps each having a body circular in cross section and carrying radially extending blades spaced from each other circumferentially of the body, the walls of the pump chambers having an arc radial to axes of the rotor for a portion between the inlet and the outlet covering an arc of greater length than the angular distance between two blades of a pump, and valve means for controlling flow of liquid from the pump chambers through the discharge passages.

16. In a hydraulic transmission, a casing having side walls and a peripheral wall, a drive shaft extending from a side of the casing, a driven shaft entering the casing through the other side thereof, said casing having a liquid chamber therein and circumferentially spaced pump chambers at a side thereof, rotary pumps in the pump chambers having shafts extending into the liquid chamber and carry gears meshing with a gear upon the driven shaft, the pump chambers each having an inlet extending through one side of wall of said casing and an outlet spaced from the inlet circumferentially of the pump chamber and communicating with a circular passage with the casing and communicating with discharge passages formed in the casing parallel with the shafts and communicating with the liquid chambers, the said discharge passages each having communication with the circular passage, and valve means for controlling flow of liquid from the pump chambers including plungers slidable longitudinally in the discharge passage to opened and closed positions.

17. In a hydraulic transmission, a casing, a drive shaft extending from a side of the casing, a driven shaft entering the casing through the other side thereof, said casing having a liquid chamber therein and circumferentially spaced pump chambers at a side thereof, rotary pumps in the pump chambers having shafts extending into the liquid chamber and carrying gears meshing with a gear upon the driven shaft, the pump chambers each having an inlet and an outlet spaced from the inlet circumferentially of the pump chamber and communicating with a circular passage disposed concentric with the casing and the shafts and communicating with discharge passages, the rotary pumps each having a shaft and a body circular in cross section and formed with radially extending pockets spaced from each other circumferentially of the body, blades in said pockets urged outwardly and bearing against the annular walls of the pump chambers, the shafts of the pumps being formed with longitudinal passages and with branch passages communicating with the pockets and the liquid chamber to prevent formation of fluid cushions under the blades, and valve means for controlling flow of liquid from the pump chambers through the discharge passages.

VERNON E. GLEASMAN.

REFERENCES CITED

The following references are of record in the file of this patent:

UNITED STATES PATENTS

| Number | Name | Date |
|---|---|---|
| 1,956,893 | Carter | May 1, 1934 |
| 2,146,717 | Berger | Feb. 14, 1939 |
| 2,178,804 | Murphy | Nov. 7, 1939 |
| 2,218,896 | Schultz | Oct. 22, 1940 |

FOREIGN PATENTS

| Number | Country | Date |
|---|---|---|
| 294,714 | Great Britain | Aug. 2, 1928 |